Figure 1:
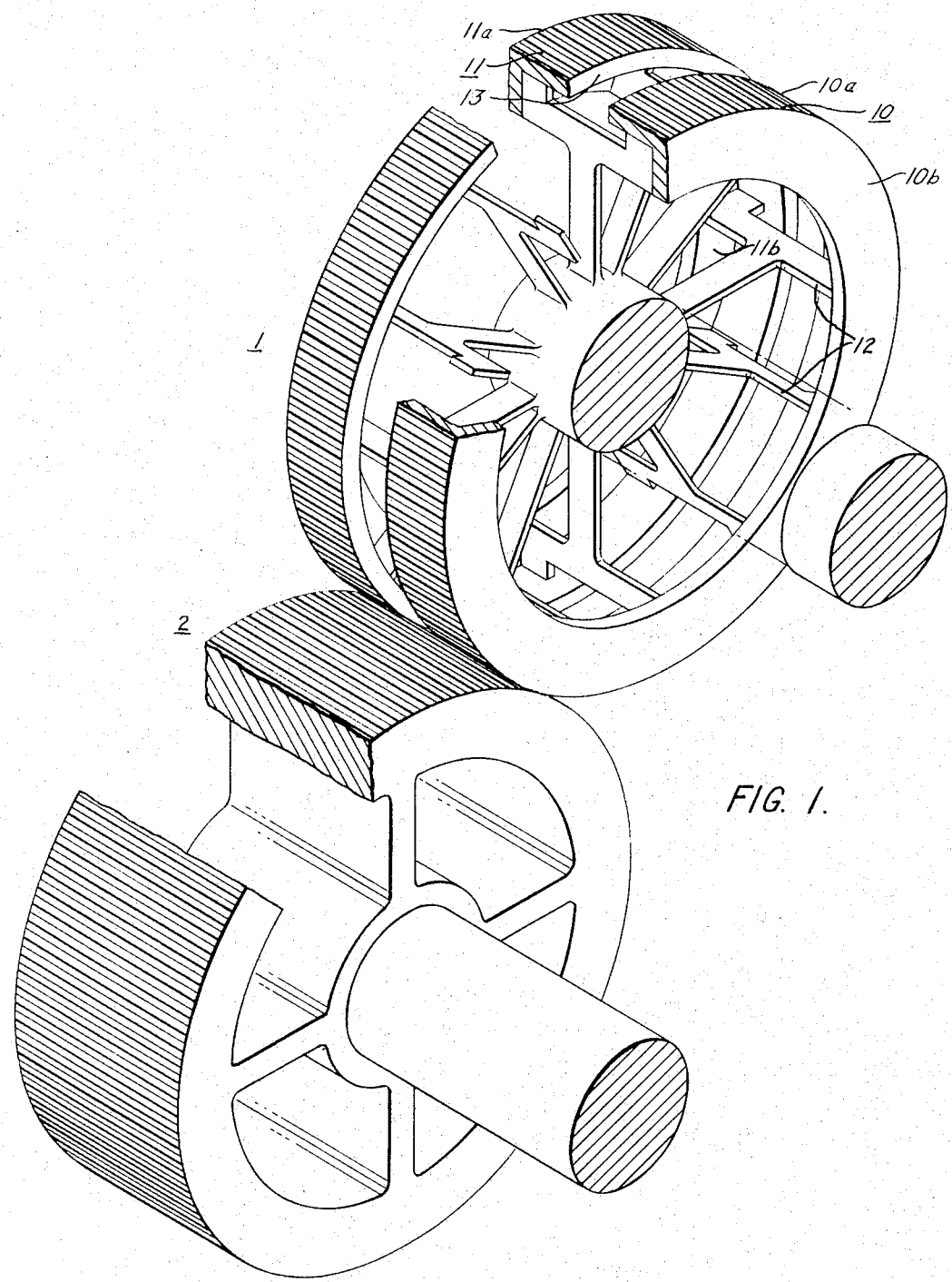

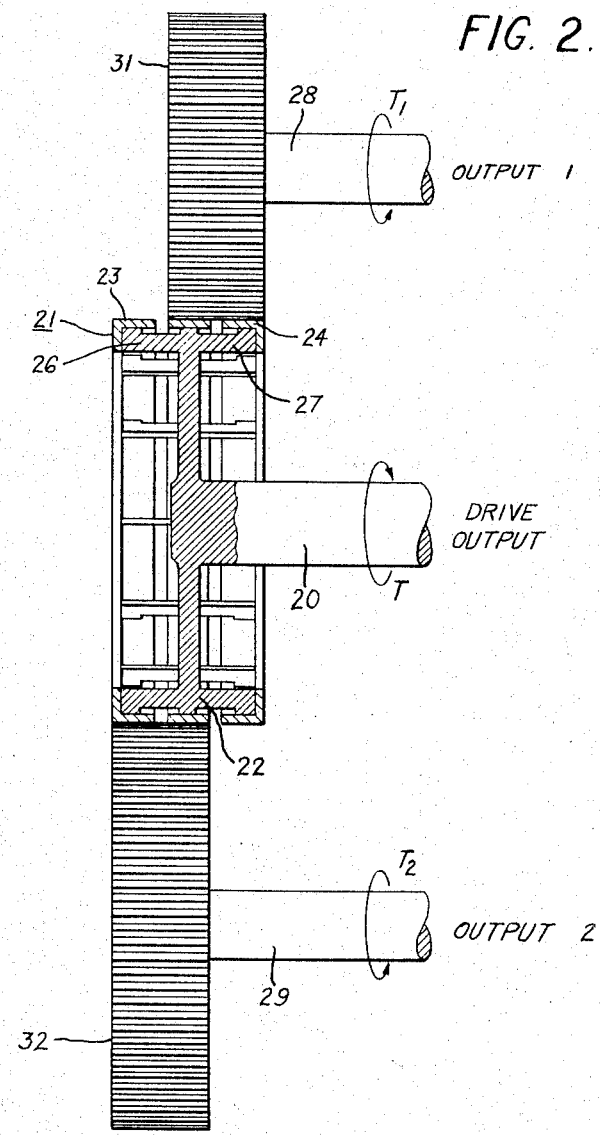

3,361,002
ANTI-BACKLASH GEAR
John H. Staehlin, Baltimore, Md., assignor to Westinghouse Electric Corporation, Pittsburgh, Pa., a corporation of Pennsylvania
Filed Sept. 18, 1964, Ser. No. 397,511
6 Claims. (Cl. 74—409)

This invention relates to a novel and improved backlash gear of integral construction wherein contiguous portions of the gear are displaced with respect to each other in torsional strain. When such gear is meshed with a conventional gear with teeth parallel to the axes of the gear the gear will be pre-loaded to eliminate backlash.

Pre-loaded gears having two sections displaced with respect to each other by means of some preloading devices such as springs or other resilient means are well known in the art. However the uniformity of the springs, their preloading and the degree of tooth displacement of the two sections is very difficult to control. Also, the assembly of the prior art pre-loaded sectional gears poses a difficult and costly manufacturing problem for a mass production item. For instrument gears, and the like, such as in servo mechanisms, where positioned shaft rotation is of prime importance and especially where the torques handled by the gears are relatively small it is very important that there be an absolute minimum of backlash and also that there be an absolute minimum ripple in the transmitted torque.

The number of prior proposals to accomplish the broad objectives of an anti-backlash gear attests to the fact that the problem has not been heretofore adequately solved. Applications of anti-backlash gears to devices to be used in space, where a natural vacuum exists give rise to new and even much more severe requirements. In all of the previous devices there have been involved, in one way or another, separate parts which must move in external frictional engagement with respect to each other in order to retain the anti-backlash characteristic. The present invention eliminates this problem of external frictional engagement by providing an anti-backlash gear in which the only friction forces involved in the gear are those of the internal friction between the molecules of the material itself.

Accordingly, a primary object of the invention is to provide novel and improved anti-backlash gear which is of integral construction.

Another object is to provide a novel and improved anti-backlash gear which is simple, inexpensive to manufacture and which can be readily manufactured by mass production methods.

Another object is to provide a novel and improved anti-backlash gear in which the teeth are held in torsional strained condition by internal forces established in the material of the gear.

A still further object is to provide a novel and improved backlash gear in which there are no external frictionally engaged surfaces.

The invention itself, however, both as to its organization and method of operation as well as additional objects and advantages will best be understood from the following description when considered in connection with the accompanying drawing, in which:

FIG. 1 is an isometric view of an anti-backlash gear in accordance with the present invention; and FIG. 2 is a view of modified form of the invention.

Briefly, the present invention comprises a gear having at least two adjacent sections that are torsionally displaced with respect to each other and held in their relative positions by the internal stresses in the material of the integral gear. When the two sections of the gear are meshed with a conventional gear the resiliency of the material permits it to be stressed for an anti-backlash fit with the mating gear.

Referring to FIGURE 1 an illustrative embodiment of the invention applied to a spur gear 1 comprises two sections 10 and 11 of a ring gear which are held in coaxial and spaced relation as later described, the relative spacing between the two sections being dependent upon the requirements such as the room available and the amount of displacement desired. One of the sections, such as section 10 is fixed to a shaft by means of a hub. In the illustrated form, the two sections 10 and 11 have an L-shaped cross section, each having a cylindrical portion, such as at 10a and 11a, and radially extending portions 10b and 11b respectively. Since the anti-backlash action is obtained by having the two sections of the gear circumferentially displaced with respect to each other the radial flanges 10b and 11b provide appropriate anchoring elements for axially extending webs 12 which may be suitably attached to the radial flanges 10b and 11b as illustrated in the drawings. The advantage of this construction is that the webs 12 can be of sufficient length in the usual case to permit necessary displacement of the two sections of the gear without exceeding the elastic limit of the material of which the gear is made.

The webs 12 may be cast integrally with both the flanges of the two sections, the webs serving as spacers to hold the sections 10 and 11 in spaced coaxial relation so that no frictional engagement of the external surfaces of the two sections exists. The two sections 10 and 11 of the gear 1 are illustrated as being separated by an annular space 13 of substantial dimension but obviously this can be of any width and could be very narrow, just short of having the inner external surfaces of the sections 10 and 11 in frictional engagement.

Instead of the webs 12 being cast integrally with the radial flanges 10b and 11b, or their mechanical equivalents, the two sections 10 and 11 could be cast in other variations of shape, so long of course as the cylindrical portions 10a and 11a are not altered. The two sections could be cast or otherwise fabricated as separate units and then the webs 12 could be welded, brazed or attached by any other suitable means to the flanges 10a and 11a. Also, if desired the webs 12 could be cast integrally with one section, for example one end of all of the webs could be cast integrally with the radial flange 11a after which the opposite ends could be affixed to the flange 10a of the section 10. The method of fabricating the gear is not an essential part of the present invention and other ways of fabrication will be apparent to those skilled in the art.

The essence of the invention resides in the gear having two sections, such as 10 and 11, of the same diameter and having the same number of teeth with the teeth of the two sections being offset peripherally by a sufficient amount to cause preloading of the webs 12 when the gear is meshed with a conventional spur gear such as that indicated at 2. If desired, with appropriate changes, the gear 1 could be properly preloaded by meshing it with a second similar gear.

The anti-backlash feature of the present gear is produced by having the gear teeth of the two sections 10 and 11 circumferentially (or peripherally) offset with respect to each other so that when they are meshed with a conventional gear such as at 2 or with a second similar sectionalized gear the webs 12 will be distorted slightly causing preloading between the sections. It will readily be apparent that this can be accomplished in many different ways depending upon the method of fabrication. The following are merely illustrative examples of methods for fabrication to produce the end result of this invention:

*Example 1.*—If one of the sections, such as section 11, is cast integrally with the web 12 the gear teeth on that section could be cut in conventional manner. The gear teeth are then cut on the other section 10 and then the free ends of the webs 12 could be attached to the flange 10b of section 10 with the gear teeth on the latter section being angularly displaced with respect to the gear teeth on section 11 by the amount of a small angle comparable to the angular travel anticipated due to backlash plus a preselected additional amount for preloading. Then when the fabricated gear is meshed with another gear, as indicated, the webs 12 will be distorted to actually produce the preloading.

*Example 2.*—The two sections 10 and 11 may be cast into an integral unit or otherwise fabricated with the webs 12 attached to the flanges 10b and 11b of the respective sections, the proportioning of the webs being such as to give a selected torque for a given angular displacement of the section 10 with respect to the section 11. The two sections may then be angularly displaced relative to each other by the desired amount and held in a suitable jig or fixture while the gear teeth are machined on both sections 10 and 11 simultaneously. Then when the two sections are released from the fixture to its free state, the teeth of the two sections 10 and 11 will be misaligned by the anticipated backlash angular error plus the small additional error desired for preloading.

*Example 3.*—Instead of proceeding as in Example 2 above, the teeth on both of the sections 10 and 11 could be machined simultaneously in axial alignment while the unit is unstressed and then relative angular displacement between the two sections could be produced by any suitable means. It will be readily apparent that in the latter instance the angular displacement between the two sections could be produced by a suitable jig or fixture while the webs or heat treated to take a permanent set position where the teeth of the two sections would be in offset circumferential relation. It will be readily apparent that if desired suitable adjustable means could be provided for adjustably setting the preloading.

Regardless of the methods of fabrication used, such as those illustrated above, the webs 12 essentially constitute leaf springs oriented so that the long dimension of their cross section extends radially of the gear. Accordingly, when the two sections 10 and 11 are angularly displaced with respect to each other the webs are stressed so that the webs are given a combination of torsional and flexure strain. This maintains the concentricity of the two sections 10 and 11 of the gear while allowing them to be displaced angularly with respect to each other. The invention has been illustrated in connection with spur gears, but it will be readily apparent to those skilled in the art that the basic philosophy of this invention can be applied to an anti-backlash gear which is meshed with a bevel gear. It is believed that this is so apparent that illustration of this in the drawing is not necessary.

The modified form of the invention illustrated in FIG. 2 extends the concept illustrated in FIG. 1 to a gear train for providing two outputs through anti-backlash gears from a single drive input. In this form a driving shaft 20 has fixed to it an anti-backlash gear 21 embodying the principles of the first embodiment. The gear 21 has a central section 22 fixed to the driving shaft 20 and two outer sections 23 and 24 each of which has the same relation with respect to central section 22 as the two sections 10 and 11 of FIG. 1 have with respect to each other. The webs 26 and 27 correspond to the webs 12 between the radical flanges 10b and 11b of the sections 10 and 11, respectively, of FIG. 1. The preloading may be accomplished in the same manner as described in connection with the first embodiment.

As in the previous embodiment the peripheral, or circumferential, displacement of sections 23 and 24 with respect to the central section 22 is such as to give the desired preload slightly greater than the torque to be supplied to the driven shafts 28 and 29, when the gear 21 is meshed with the spur gears 31 and 32, respectively. It is to be noted that in this embodiment the central section 22 of gear 21 meshes with both gears 31 and 32 while the section 23 meshes only with gear 32 and section 24 meshes only with gear 31 while the strain in webs 26 and 27 supply the anti-backlash torque.

From the above description, it will be apparent that the present invention provides an anti-backlash gear which eliminates frictional contact between any portions of the gear and that any relative movement of different portions of the gears is limited to the internal friction of the molecules of the material. This is extremely important where the gears are to be used under conditions of natural vacuum, such as in space, where the evaporation of lubricant between frictionally engaged external surfaces reduces the reliability of operation. The anti-backlash gear in combination with the conventional spur gear or with another gear of suitable construction designed to give the preselected loading will provide the maximum in their liability when used in space because it requires no lubrication. Although the present invention is particularly advantageous in space applications, it is also a substantial advance in the art for applications under all other environments because it is simple and inexpensive to manufacture.

It will be readily apparent to those skilled in the art that various changes and modifications can be made without departing from the spirit of the invention.

I claim as my invention:

1. An anti-backlash gear comprising a first section and a second section, means for supporting one of said sections on a shaft, means for holding said second section in spaced coaxial relation with said first section including flexible webs whose length is greater than their transverse dimension.

2. An anti-backlash gear comprising a hub including a radially extending portion having arms extending laterally therefrom, a plurality of gear sections supported by said hub, at least one of said sections being supported on said arms, each of said sections having the same number of teeth and being held in spaced coaxial relation by said laterally extending arms, said arms being resiliently distortable to thereby yieldably hold said gear sections in predetermined angular relation with the teeth of the respective gear sections out of axial alignment.

3. The combination as set forth in claim 2, in which said radially extending portion of said hub includes individual spokes and said arms extend at right angles to said spokes.

4. The combination as set forth in claim 2, in which said arms extending from said radially extending portion have a length greater than their transverse dimension to permit limited distortable relative angular movement between said sections while at the same time retaining the spaced coaxial relation of said sections.

5. The combination as set forth in claim 2, in which said hub includes T-shaped spokes having a radial portion integral with said hub and said arms, said arms extending transversely and axially of said hub, said arms constituting the sole support for said sections to retain them in rigid spaced coaxial relation but in yieldable selected angular relation with their teeth normally out of axial alignment.

6. The combination as set forth in claim 2, in which there are a pair of gear sections with arms extending on either side of said radially extending portion, said arms constituting sole support for said sections to retain them in rigid spaced coaxial relation but in yieldable selected angular relation with their teeth normally out of axial alignment.

References Cited

UNITED STATES PATENTS

| | | | |
|---|---|---|---|
| 2,663,198 | 12/1953 | Cairnes | 74—440 |
| 2,845,809 | 8/1958 | Hetzel | 74—440 |
| 2,868,033 | 1/1959 | Gaither | 74—440 |
| 2,902,879 | 9/1959 | Anderson | 74—440 |
| 2,966,806 | 1/1961 | Luning | 74—409 |
| 3,035,454 | 5/1962 | Luning | 74—440 |
| 3,127,784 | 4/1964 | O'Neill | 74—440 |
| 3,138,035 | 6/1964 | Sivaslian | 74—440 |
| 3,174,356 | 3/1965 | Michalec | 74—409 |

DONLEY J. STOCKING, *Primary Examiner.*

DAVID J. WILLIAMOWSKY, *Examiner.*

L. H. GERIN, *Assistant Examiner.*